United States Patent [19]

Baird et al.

[11] Patent Number: 4,620,834
[45] Date of Patent: Nov. 4, 1986

[54] WIND MACHINE WITH CLUTCH HAVING LOSH MOTION CHARACTERISTIC

[76] Inventors: John P. Baird, Fox Hill, via Hall, New South Wales, Australia, 2618; Ian W. Linnett, 22 Bisdee Street, Hughes, Australian Capital Territory, Australia, 2605; William J. MacLeod, 18 Gouger Street, Torrens, Australian Capital Territory, Australia, 2607

[21] Appl. No.: 744,665

[22] Filed: Jun. 14, 1985

Related U.S. Application Data

[63] Continuation of Ser. No. 361,485, Mar. 24, 1982, abandoned.

[30] Foreign Application Priority Data

Apr. 3, 1981 [AU] Australia ............................. PE8300

[51] Int. Cl.[4] ............................................. F03D 11/02
[52] U.S. Cl. ................................. 416/32; 416/169 R
[58] Field of Search ................. 416/32, 169 B, 51 A, 416/52 A; 415/18; 73/537, 538

[56] References Cited

U.S. PATENT DOCUMENTS

| | | | |
|---|---|---|---|
| 505,827 | 10/1893 | Hall et al. | 192/105 CS |
| 677,747 | 7/1901 | Sterzing . | |
| 692,714 | 2/1902 | Sala et al. | 416/169 B |
| 806,377 | 12/1905 | Sturtevant . | |
| 829,128 | 8/1906 | Sturtevant . | |
| 849,288 | 4/1907 | Thomas | 192/105 CS |
| 930,794 | 8/1909 | Pierson | 416/32 |
| 964,374 | 7/1910 | Bey | 416/32 X |
| 1,279,642 | 9/1918 | Brady . | |
| 1,342,318 | 6/1920 | Yanacopoulos | 416/52 A |
| 1,466,026 | 8/1923 | Manning | 416/32 |
| 1,661,172 | 3/1928 | England . | |
| 1,718,105 | 6/1929 | Benn . | |
| 1,793,735 | 2/1931 | De la Mater | 192/105 C |
| 1,804,493 | 5/1931 | Benjamins | 416/32 |
| 1,813,638 | 7/1931 | Rawson | 192/105 C |
| 1,816,632 | 7/1931 | Bucklen | 416/32 X |
| 1,941,611 | 1/1934 | Manikowske | 416/32 X |
| 2,497,544 | 2/1950 | Gravina | 192/105 C |
| 3,891,347 | 6/1975 | Jacobs et al. | 416/32 |

FOREIGN PATENT DOCUMENTS

| | | | |
|---|---|---|---|
| 240640 | 8/1962 | Australia . | |
| 58800 | 11/1966 | Australia . | |
| 48748 | 4/1977 | Japan | 416/32 |
| 1628 | of 1787 | United Kingdom . | |
| 10793 | of 1892 | United Kingdom . | |
| 10807 | of 1892 | United Kingdom . | |

*Primary Examiner*—Everette A. Powell, Jr.
*Attorney, Agent, or Firm*—Cushman, Darby & Cushman

[57] ABSTRACT

This invention concerns a wind driven machine including a clutch mechanism for connecting a rotary output shaft from a wind driven member to a second shaft adapted to be rotated by the output shaft. The mechanism comprises a clutch drive portion arranged to rotate with but to be axially moveable in relation to the output shaft between a disengaged and an engaged position in which it engages a clutch driven portion fixed to the second shaft. The drive portion is biased towards the disengaged position and is moveable to the engaged position under the influence of weights mounted on a lever pivoted to a member fixed to the output shaft and linked to the drive portion.

4 Claims, 5 Drawing Figures

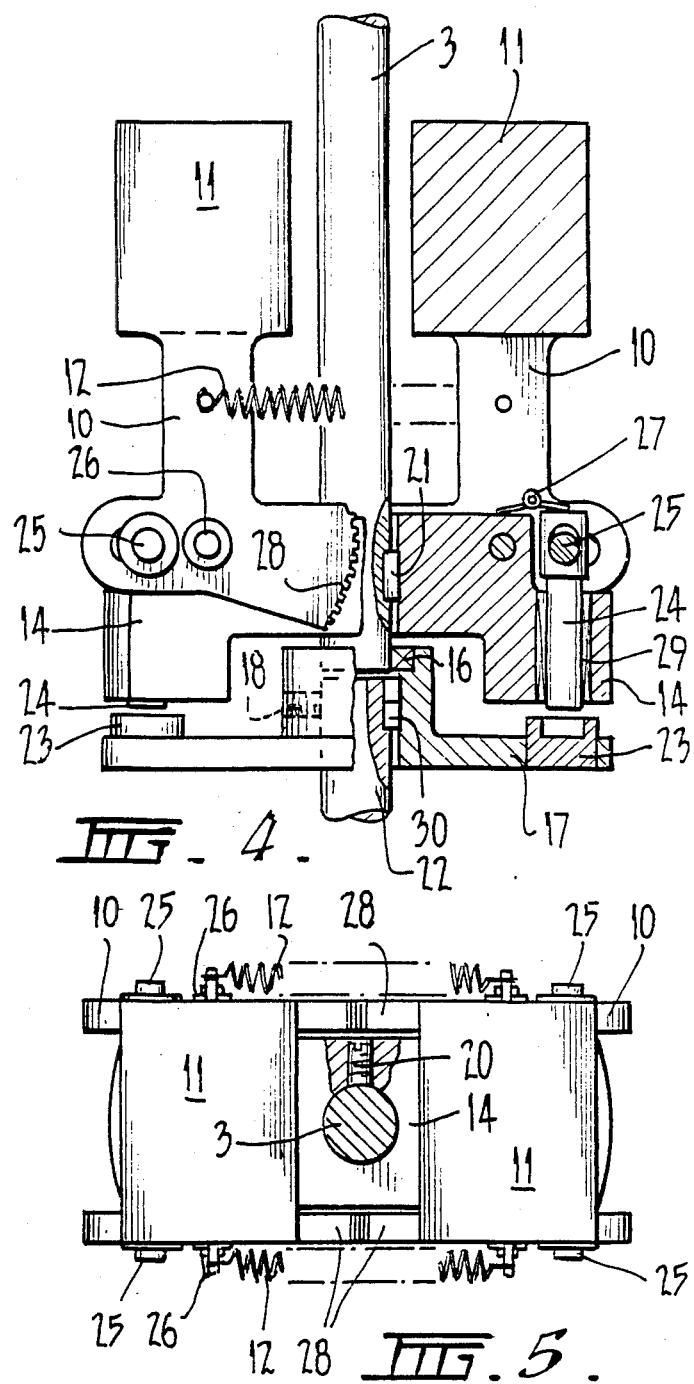

WIND MACHINE WITH CLUTCH HAVING LOSH MOTION CHARACTERISTIC

This is a continuation of application Ser. No. 361,485, filed Mar. 24, 1982, which was abandoned upon the filing hereof.

FIELD OF THE INVENTION

This invention relates to coupling devices for use in wind driven auxiliary power systems or wind driven water pump systems. The invention is particularly relevant to the latter system where it has its main use in pumping liquids from bores, dams, tanks or storage facilities.

DESCRIPTION OF THE PRIOR ART

Existing wind driven water pump systems use a reciprocating piston pump (usually vertically reciprocating) which pump requires frequent maintenance, especially in locations where the water is contaminated by dirt, grit or other abrasive materials. Examples of these systems are the well known Southern Cross and Comet windmills.

The result of an international search made by the Australian Patent Office has been to draw the following patent specifications to applicant's attention:

1. United Kingdom

No. 1628 (1787)
No. 10793 (1892)
No. 10807 (1892)

2. Australia

No. 240640 (63918/60)
No. 58800/65

3. United States of America

Group (i) U.S. Pat. No. 677,747
Group (ii) U.S. Pat. Nos. 806,377; 829,128; 1,718,105.
Group (iii) U.S. Pat. Nos. 1,279,642; 1,661,172.

The foregoing specifications are discussed in the following paragraphs.

1. United Kingdom Patents

No. 1628 is mainly of historical interest but does show a centrifugally operated device used (for example) to engage and disengage the wind sails. U.K. Pat. Nos. 10793 and 10807 are also mainly of historical interest; disclosed in each is a mechanism for transferring reciprocal to rotary motion allowing for a "dwell period".

2. Australian Patents

No. 240,640 discloses an actuator for a member such as a valve which is to be operated alternatively manually or by a motor. The arrangement is such that the actuator is normally connected up for manual operation of the valve or the like equipment. Upon energisation of the motor, however, weights are rotated and are able to move radially outwards against the action of springs. The movements of the weights are transmitted through a clutch sleeve to disengage dogs from mating dogs on a manually operated bevel wheel and cause them to re-engage on mating dogs on a member driven by the motor.

No. 58,800/65 discloses a mechanism particularly suitable for providing adjustment between members of a brake linkage system to compensate for wear. The disclosure details a linkage output member, the amount of movement of which is controlled to a fixed stroke by an adjustable motion limiting means.

3. U.S. Patents

Group (i) U.S. Pat. No. 677,747, the only specification in this group is mainly of historical interest but it does disclose an automatic friction clutch mechanism operated by a governor/trip mechanism combination. This is particularly described at columns 2 and 3 of the Specification. See particularly column 3, lines 3 to 18.

Group (ii) U.S. Pat. No. 806,377 discloses a clutch which is centrifugally operated by weights to the inside casing of a hollow fly wheel mounted to rotate with the powered shaft. As the weights pivot radially outward at higher rotational speeds, shoulders on the weights engage corresponding shoulders on an annular clutch member to move it axially towards engagement with a disc clutch member fixed to the driven shaft. The movement of the annular member is axially resisted by springs in compression attaching it to an inside wall of the hollow flywheel. While the basic principle of this clutch does not differ greatly from that of the present application, its constructional details are quite different. For example, in this specification, the annular clutch member is not slidably mounted on the drive shaft; the springs are in compression rather than tension, and further are not connected between a fixed position on the drive shaft and a lever mounting the weights.

Pat. No. 829,128 discloses an automatic clutch especially for automobiles, and Pat. No. 1,718,105 discloses a centrifugally operated clutch especially for use with induction motors. Both disclosures are closely similar to that of Pat. No. 806,377 so it is not proposed to elaborate on these specifications.

Group (iii) Pat. No. 1,279,642 discloses a centrifugally operated clutch mechanism for engaging a drive to a generator from the rotary output shaft of a windmill. Again, while in principle this clutch is similar to that of the present application, it differs markedly in construction. Thus this specification describes a drive clutch member (23) which is freely rotatable on shaft 18, being driven by belt 29, in turn being driven via pinions from a windmill driven shaft. In the present invention, the clutch drive member is mounted on the equivalent shaft to be rotatable therewith. There are a number of other constructional variations (e.g. in the lever arm and spring arrangements) which are apparent on a detailed comparison of the two inventions.

Pat. No. 1,661,172 is again a disclosure of a clutch mechanism similar in principle but different in construction to that disclosed in the present application. It is atypical of centrifugal clutch mechanisms in that the weights do not directly effect the movement of the clutch members into engagement. Rather, this is done via a linkage including a toggle mechanism operating against spring tension. In this respect, the disclosure is different from, and much more complex than the mechanism of the present application. Additionally, there is only one shaft involved in the mechanism; the drive clutch portion (comprising pulley 1 and disc 5) is freely rotatable on the shaft to be driven (i.e. 2), the driven clutch portion being disc 3. In this respect Pat. Nos. 1,661,172 and 1,279,642 are equivalent, and both markedly differ from the present application.

SUMMARY OF THE INVENTION

The instant invention includes the coupling of a wind driven device to a helical rotor pump through a clutch mechanism of particular characteristics. The preferred characteristic is that the cut-in speed of the clutch mechanism is higher than the cut-out speed thereof. A vertical axis windmill can constitute the wind driven device, thus eliminating much of the heavy machinery at the head of the tower of a conventional mill. Alternatively, a conversion system could be used in conjunction with a standard horizontal axis wind turbine to produce an axial rotation whereby to drive the helical rotor pump.

An advantage of the foregoing system is that where auxiliary power is required, the system allows an easy change over simply by belt replacement, or other arrangement (e.g. geared) whereby the rotary drive connects to the auxiliary power system. This is to be contrasted with the prior art systems referred to above which require the use of a separate, expensive, pump jack.

A further advantage is that with the use of the clutch the lowest wind in which the wind turbine will operate is independent of the gear ratio and is a function of the clutch adjustment only. As a result, a high gear ratio can be chosen such that in moderate winds (above 16 km/hr) the wind turbine pumps at a much faster rate than its conventional counterpart whose gear ratio must be kept low to ensure good low wind operation.

Furthermore, the clutch allows the wind turbine to turn at higher tip speed ratios during intermittent (or light wind) operation and improves efficiency in this region as well (by approximately 40%). Preliminary field tests indicate that on average the wind turbine will pump up to four times as much water as a standard wind mill of the same swept area and in the same location.

It is to be noted that while the power coefficient of the vertical axis wind turbine (S rotor) to be used in the prototype is 0.26 at a tip speed ratio of 0.8 maximum power coefficient of a standard multibladed mill is reported to be 0.31. However it is anticipated that the prototype will pump more water than the standard equivalent both at low speeds when the action of the clutch allows the turbine to turn at a more favourable tip speed ratio, and at high wind-speeds when the standard equivalent would be governed.

Having regard to the preceding description and explanation, the invention broadly comprises a wind driven machine including a clutch mechanism for connecting a rotary output shaft from a wind driven member to a second shaft adapted to be rotated by said output shaft, said mechanism comprising a clutch drive portion arranged to rotate with but to be axially moveable in relation to said output shaft between a disengaged position and an engaged position in which it engages a clutch driven portion fixed to said second shaft, said drive portion being biased towards said disengaged position and being moveable to said engaged position under the influence of a plurality of weights each respectively mounted on a lever pivotted to a member fixed to said output shaft and linked to said drive portion, the arrangement being such that rotation of said output shaft causes each said weight to move outwardly of said output shaft whereby to cause said lever to move said drive portion toward and into said engaged position.

BRIEF DESCRIPTION OF THE SEVERAL VIEWS OF THE DRAWINGS

The system of the invention will now be described in detail with reference to the accompanying drawings of preferred embodiments.

FIGS. 4 and 5 are representations similar to FIGS. 2 and 3 of a further embodiment.

Figure 1:
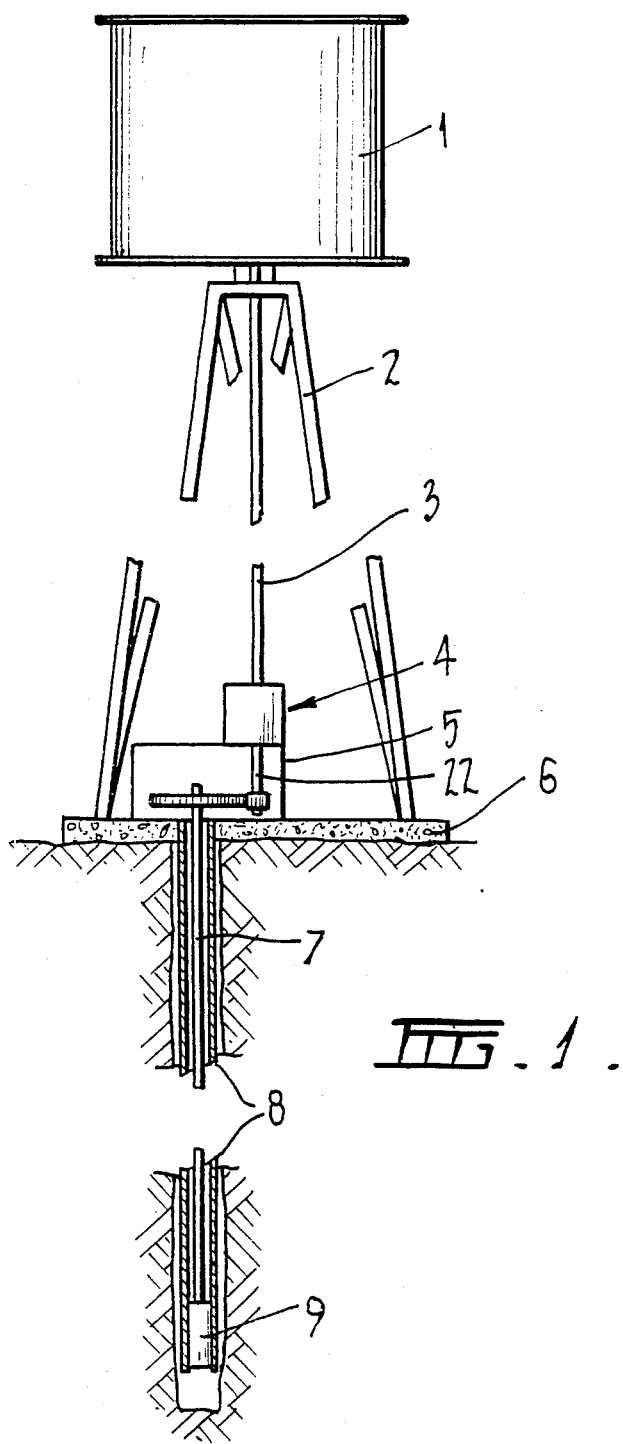
FIG. 1 is a diagrammatic representation of a preferred wind machine of the invention.

Now referring firstly to FIG. 1 a wind turbine 1 is mounted on a supporting tower 2. Turbine 1 may be of any type but is preferably a vertical axis type, for the reasons previously discussed. A vertical axis type turbine also simplifies construction of the drive train. A rotatable shaft 3 is directly coupled to turbine 1 by fixed connection, or it may be geared or belt-connected drivably thereto. A dog 4 having a cut-in speed higher than the cut-out speed interrupts the drive train. Item 5 is a support stand, which, together with tower 2 is mounted on base 6, preferably of concrete. Shaft 7 is a rotatable shaft forming part of the drive train within bore casing or the like 8 and driving a known type of helical rotor pump 9.

Figure 2:
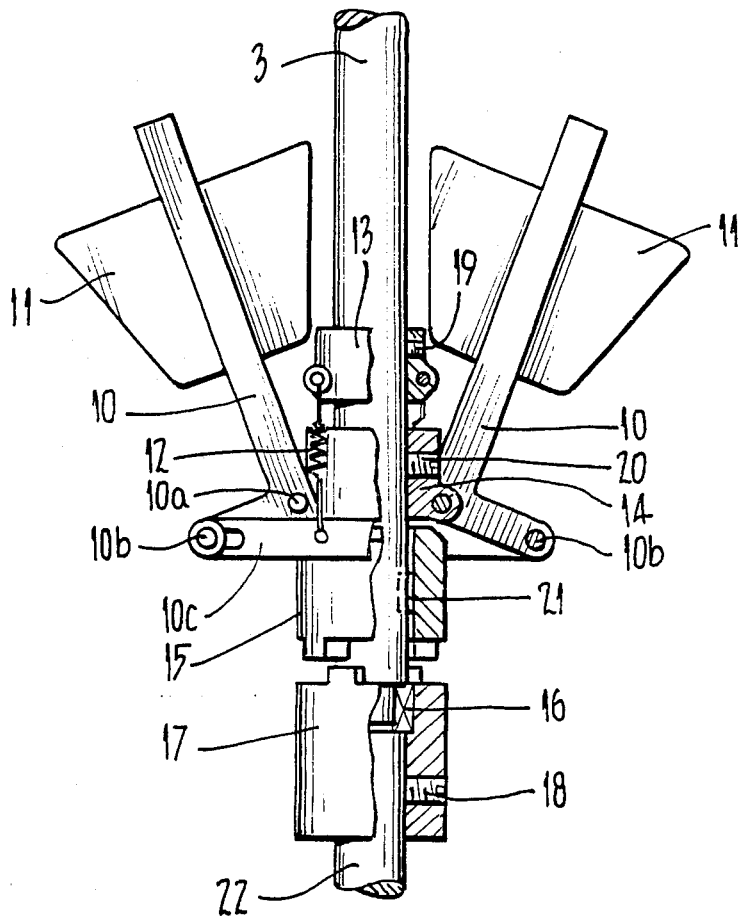
FIG. 2 is a sectional elevation of a preferred embodiment of a clutch mechanism.
Figure 3:
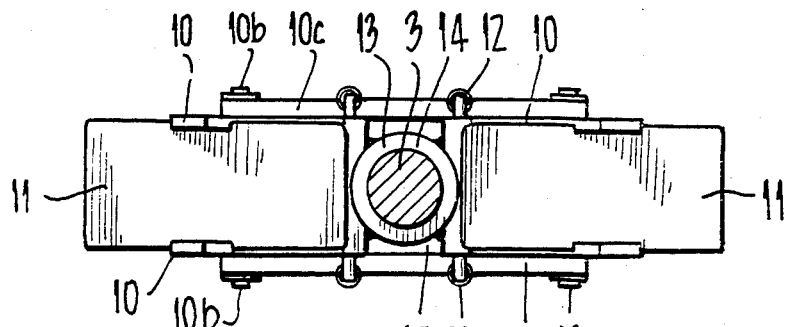
FIG. 3 is a plan view of the embodiment shown in FIG. 2.

FIGS. 2 and 3 are two views of details of the clutch mechanism 4. Item 3 is the input shaft and item 22 the output shaft which shafts can be engaged by upper and lower (dog) clutch members 15 and 17. A pair of bell cranks 10 supports weights 11 which can pivot inwardly or outwardly of the shaft to engage or disengage the clutch members. A pair of springs 12 constitute a bias mechanism for returning the clutch mechanism to the disengaged position when rotation speed of shaft 3 is rotating slowly or not at all. Item 13 is a fixed member (relative to shaft 3) acting as an anchorage for springs 12; screw member 19 is used to fix 13 to shaft 3.

Item 14 is a shell member fixed to shaft 3 by screw member 20 whereby to form an anchorage point for bell cranks 10. Bearing 16 permits relative rotation between shaft 3 and clutch member 17 when the clutch portions 15 and 17 are disengaged. Note that clutch member 17 is fixed to shaft member 22 by screw member 18.

The position of the apparatus as illustrated in FIG. 2 is the no rotation (or slow rotation) condition. As shaft 3 commences to rotate at the cut-in speed (being driven by the turbine) weights 11 on bell cranks 10 move radially outwardly by pivoting action about pivots 10a. In so doing joint 10b (slidable in slot in collar member 10c to accommodate radially inward movement of 10b as the lower bell crank arm pivots inwardly towards shaft 3) pushes 10c downwardly. Hence clutch member 15, which is fixed to collar 10c moves downwardly to engage clutch member 17. Member 15 is axially slideable along shaft 3, but keyed to rotate therewith by virtue of key 21. The arrangement and dimension of weights 11, springs 12, bell cranks 10 and the lost motion between 10b and 10c is such that the cut-in speed is higher than the cut-out speed, the latter, of course, occurring as the rotation speed of shaft 3 falls below the design limit.

FIGS. 4 and 5 are two views of details of a different dog clutch mechanism 4.

Item 3 is the input shaft and item 22 is the output shaft which shafts can be engaged by striker pins item 24 engaging anvils item 23. A pair of bell cranks 10 support weights 11 which can pivot inwardly and outwardly to engage or disengage the clutch members. A pair of springs 12 constitute a bias mechanism for returning the clutch mechanism to the disengaged position when shaft 3 is rotating slowly or not at all. A pair of gear segments 28 on the bell cranks 10 intermesh to ensure simultaneous motion of the bell cranks.

The clutch body 14 is fixed to the input shaft 3 by key member 21 and forms an anchorage for the bell cranks 10 at pivot 26 and provides a bearing 29 for the striker pins 24. The lower clutch member 17 is fixed to the output shaft 22 by key member 30 and locking screw 18 carries the pair of anvils 23 and the bearing 16 which permits relative rotation between shafts 3 and 17 when the striker pins 24 are disengaged from the anvils 23.

The striker pins 24 are operated via a slotted hole in the head by transverse beams item 25 which are supported on rollers in the slotted hole in the bell cranks 10. Springs 27 bias the striker pins 24 in the slotted hole away from the lower anvils 23.

The apparatus has two mutually exclusive stable configurations. The slow rotation (or no rotation) position illustrated in FIG. 4, is stable up to the cut-in speed but unstable at higher speeds. The fully engaged position once adopted is stable at speeds above the cut-out speed but unstable at lower speeds.

With the apparatus in the low speed configuration of FIG. 4 and as shaft 3 commences to rotate at the cut-in speed (being driven by the turbine) weights 11 on bell cranks 10 move radially outwardly by pivotting action about pivot 26. In so doing beam 25 (rolling in the slot in the bell crank 10 to accommodate radially inward movement as the lower bell crank arm pivots inwardly towards shaft 3) pushes the striker pins 24 downwardly to engage in the anvils 23 carried on the lower clutch member 17. The change from one stable position to another at the cut-in speed ensures full engagement.

With the apparatus in the high speed fully engaged configuration and as shaft 3 slows to rotate at cut-out speed weights 11 on the bell cranks 10 commence to move radially inwardly by pivotting about pivot 26, until the lost motion between the striker pin 24 and the transverse beam 25 is taken up. The striker pin 24 then separates from the anvils 23 with a snap action to overcome the frictional forces between the two members and disengage the clutch. The weights 11 and the bell crank 10 return to the low speed stable position of FIG. 4 and the spring 27 biases the striker pin 24 away from the anvils 23.

The arrangement and dimensions of weights 11, springs 12, bell cranks 10 and the lost motion between the beam 25 and the striker pin 24 is such that the cut-in speed is higher than the cut-out speed and the engagement/disengagement occurs rapidly. Disengagement occurs when the rotational speed of shaft 3 falls below the design limit.

It should be emphasised that the present invention is not to be limited to the embodiment specifically shown but should be given a broad connotation.

We claim:

1. In a wind-driven machine: a wind-driven member; a first rotary shaft driven by the wind-driven member; a second rotary shaft; a centrifugal dog clutch having engaged and disengaged positions for drivingly connecting and disconnecting, respectively, said first and second shafts; bias means resiliently urging said clutch toward a disengaged position; at least one centrifugal weight means rotatable with said first shaft and movable along a path toward and away from said first shaft in response to decreasing and increasing rotational speed of said first shaft, and a clutch-control linkage interconnecting said centrifugal weight means and said clutch for engaging said clutch, at a predetermined high speed of said first shaft against the force of said bias means and for disengaging said clutch at a speed of said first shaft which is lower than said predetermined high speed, said linkage including a lost motion device which, upon decreasing rotational speed of said first shaft below said predetermined high speed, permits limited independent movement of said weight toward said first shaft without causing engagement of said clutch.

2. A wind-driven machine as in claim 1 wherein said clutch includes a first dog member rotatable with said first shaft and movable relative to said first shaft into and out of engagement with a second dog member connected to said second shaft, said bias means resiliently urging said first dog member toward disengagement with said second dog member.

3. A wind-driven machine as in claim 1 wherein said lost motion device includes a slot and pin arrangement in which the pin resides in a slot having opposite closed ends and is movable along said slot for engagement with the ends thereof.

4. A wind-driven machine as in claim 2 wherein said first shaft is vertical, wherein said weight means includes an element mounted for pivotal movement toward and away from said first shaft about a horizontal axis, and wherein said lost motion device includes a horizontally extending pin carried by said element and residing in and movable along a slot in said first dog member, the slot having first and second closed ends and the arrangement being such that pivtal movement of said element toward and away from said first shaft moves the pin along the slot and into engagement with, respectively, the first and second ends of the slot, said bias means biasing said second dog member in a direction to engage the second end of the slot with the pin.

* * * * *